No. 690,785. Patented Jan. 7, 1902.
L. R. SOSNA.
SAW.
(Application filed Aug. 9, 1901.)
(No Model.)
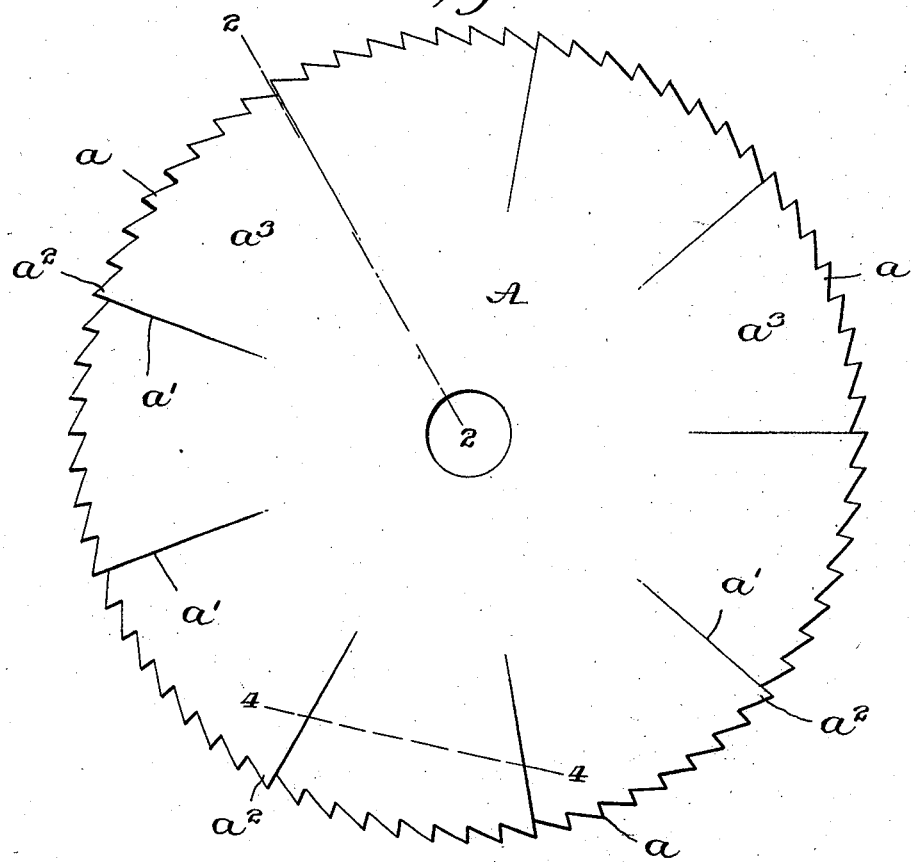
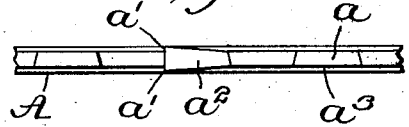
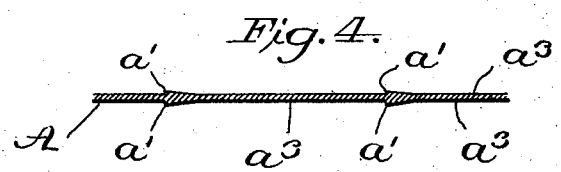
WITNESSES:
INVENTOR
Leopold R. Sosna
BY
John R. Nolan
ATTORNEY.
THE NORRIS PETERS CO., PHOTO-LITHO., WASHINGTON, D. C.

UNITED STATES PATENT OFFICE.

LEOPOLD R. SOSNA, OF PHILADELPHIA, PENNSYLVANIA, ASSIGNOR OF ONE-HALF TO RUDOLPH J. SOSNA, OF PHILADELPHIA, PENNSYLVANIA.

SAW.

SPECIFICATION forming part of Letters Patent No. 690,785, dated January 7, 1902.

Application filed August 9, 1901. Serial No. 71,443. (No model.)

*To all whom it may concern:*

Be it known that I, LEOPOLD R. SOSNA, a citizen of the United States, residing in the city and county of Philadelphia, in the State of Pennsylvania, have invented certain new and useful Improvements in Saws, of which the following is a full, clear, and exact description, reference being had to the accompanying drawings, forming a part of this specification.

The object of this invention is to provide a saw having thereon lateral cutters extending from and affording, in effect, a continuation of the forward edges of the teeth, whereby during the operation of the saw the severed surfaces of the plank are smoothed and planed, as will be hereinafter particularly described and claimed.

In the drawings, Figure 1 is a side elevation of a circular saw embodying my invention. Fig. 2 is a vertical section of a portion thereof as on the line 2 2 of Fig. 1. Fig. 3 is an edge view, enlarged, of a portion of the saw. Fig. 4 is a section as on the line 4 4 of Fig. 1.

A represents the body of a circular saw, and $a$ the peripheral teeth thereof. On the faces of the saw are formed radial cutters $a'$, which extend from and afford, in effect, a continuation of the radial edges of predetermined saw-teeth $a^2$. These cutters are preferably formed by grinding or otherwise reducing the faces of the saw in spaces between the teeth $a^2$ and radially inward, as at $a^3$, to about midway, or substantially so, between the center and the periphery of the saw. The cutters on the respective faces of the saw are directly opposite to each other, as indicated, and the thickness of each tooth, from which extends a pair of cutters, comprises the width of both cutters. Hence concurrently with the operation of the saw-teeth the laterally-disposed cutters act upon the opposing severed sides of the plank in a manner to smooth and plane the same.

I would remark that my invention is not restricted to the particular type of saw shown and described.

I claim—

1. A saw having on its respective faces cutters extending inwardly from and affording in effect a continuation of the forward edges of certain saw-teeth, the cutters on the respective faces being directly opposite to each other, and the thickness of each tooth from which extends a pair of cutters, including the width of both cutters.

2. A circular saw provided on its respective sides with radial cutters extending from and forming in effect a continuation of the radial edges of certain saw-teeth, the cutters on one side being directly opposite the cutters on the other side, and the thickness of each tooth from which extends a pair of cutters, including the width of both cutters.

3. A circular saw having its respective faces ground or reduced in spaces between predetermined teeth and radially inward to form integral radial cutters extending from and forming in effect a continuation of the radial edges of said teeth.

In testimony whereof I have hereunto affixed my signature in the presence of two subscribing witnesses.

LEOPOLD R. SOSNA.

Witnesses:
 ANDREW V. GROUPE,
 JOHN R. NOLAN.